Dec. 29, 1970   C. E. DREMANN ET AL   3,551,184
METHOD OF BONDING LITHIUM TO OTHER METALS
Filed March 9, 1967
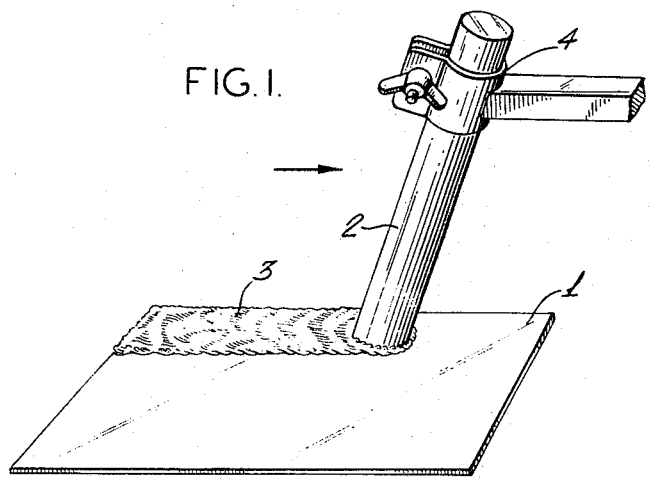
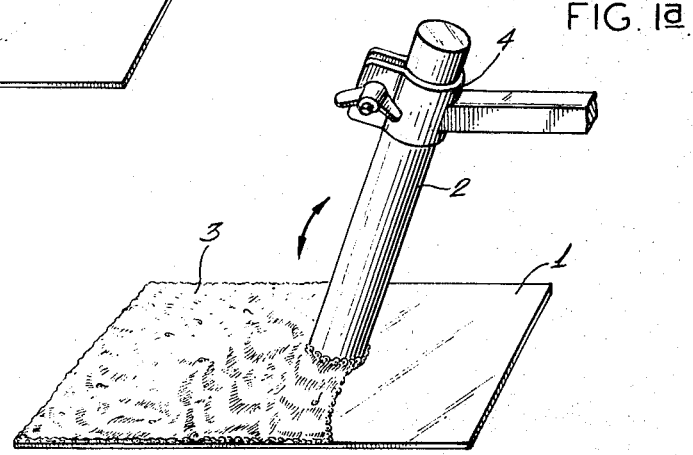
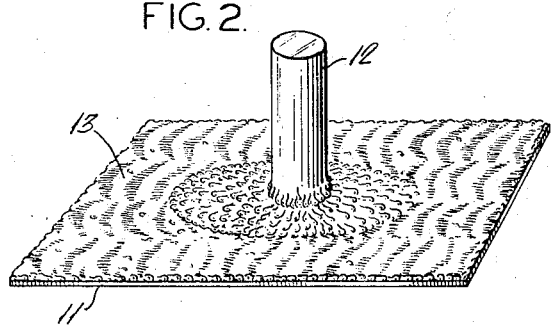
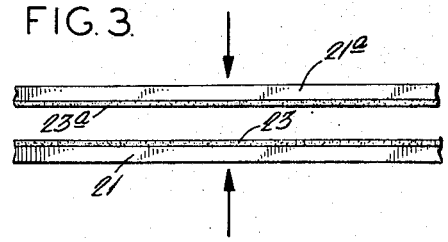
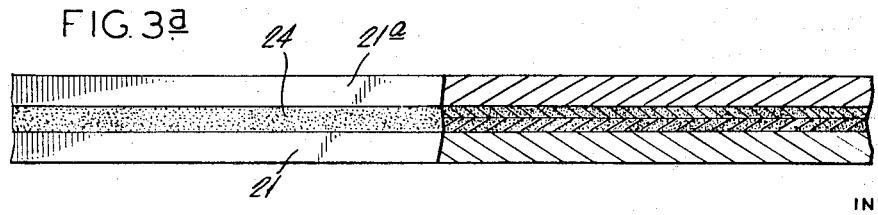
INVENTORS:
CHARLES E. DREMANN
JAY R. HITCHINGS
BY Howson & Howson
ATTYS.

United States Patent Office 3,551,184
Patented Dec. 29, 1970

3,551,184
METHOD OF BONDING LITHIUM TO OTHER METALS
Charles E. Dremann, Phoenixville, and Jay R. Hitchings, West Chester, Pa., assignors to Foote Mineral Company, Exton, Pa., a corporation of Pennsylvania
Filed Mar. 9, 1967, Ser. No. 621,921
Int. Cl. C23c *11/00*
U.S. Cl. 117—50          8 Claims

ABSTRACT OF THE DISCLOSURE

A body of solid lithium metal is rubbed across the surface of a metal body other than lithium with the metal body at a temperature above the melting point of lithium to wet the surface of the metal body with molten lithium in areas traversed by the wiping action. On solidification of the lithium a uniform bond is provided between it and the metal body. Additional lithium may be added to form a thicker coating. Two metal bodies may be bonded together by lithium so applied.

---

In the proposed fabrication of lithium anodes for batteries, the lithium should be bonded to another metal which serves as current conductor and to which connections can be made. The lithium should be firmly and uniformly bonded to the other metal otherwise delamination will occur through the action of the battery electrolyte or during fabrication where the assembly would be subjected to mechanical forces like rolling, stamping, and the like, or battery failure may occur during recharging in a rechargeable battery due to uneven redeposition of lithium. Attempts to form lithium-containing bimetallic strips by co-rolling, cold pressing, hot pressing, powder bonding and the use of a lithium-mercury amalgam proved unsuccessful. While it has been said that molten lithium diffuses into copper (U.S. Pat. 3,226,261) uniform bonds could not be obtained between copper and lithium by simply contacting the copper with molten lithium as by immersing the copper in molten lithium or by melting lithium in stationary contact with the copper.

As will appear hereinafter, the present invention provides a means for bonding lithium to another metal whereby the bond between the lithium and the base metal is uniform throughout the entire area defined by the lithium layer. As will also appear hereinafter, lithium coatings of any reasonable thickness may be built up on the base metal, and two bodies of like or dissimilar metals may be bonded together by means of the lithium applied in accordance with the present invention.

Therefore, it is the principal object of the present invention to provide an improved method for bonding lithium to another metal.

It is another object of the present invention to provide a method for providing sound, uniformly-bonded coatings of lithium on another metal.

It is a further object to provide uniformly bonded bimetallic metal structures in which lithium is one of the metals.

Still another object of the present invention is to provide a method for bonding two bodies of metal together by means of an intermediate lithium layer.

Other objects, including the provision of metal structures in which bodies of metal other than lithium are bonded together by means of lithium metal, will become apparent from a consideration of the following specification and claims.

The method of the present invention comprises rubbing, with solid lithium metal, the surface of a solid body of metal other than lithium having a temperature of at least 375° F., a melting point above said temperature and, at said temperature, a stable film thereon of oxide thereof and being incapable, at said temperature, of forming substantially immediately a eutectic with lithium, whereby areas contacted with and traversed by the lithium metal become coated with molten lithium, and thereafter cooling the assembly to solidify the lithium metal.

Additional molten lithium may be applied to the resulting lithium coating to increase the thickness of the lithium layer.

The lithium-coated body of metal of the present invention comprises the stated metal body having on a surface thereof a coating of lithium metal substantially uniformly bonded to the metal body substantially entirely throughout the area coated by the lithium. Because of this the lithium-coated metal body can be subjected to mechanical pressure to reduce the lithium coating to a uniform thickness without delamination which would otherwise occur in areas in which nonuniform poorer bonding is present.

Two metal bodies, each coated with lithium as described above, may be brought together with the lithium coatings, in a molten condition, therebetween, and the assembly cooled to solidify the lithium and to provide a sandwich structure in which the two metal bodies, which may be the same or different metals, are bonded together by the intermediate layer of lithium.

Reference may be made to the drawings in which:

FIG. 1 is a perspective view of a mode of carrying out the present method shortly after the coating operation has begun;

FIG. 1a is the same view as in FIG. 1 although somewhat further along in the coating operation;

FIG. 2 is a perspective view illustrating one embodiment wherein additional lithium is added to the initial lithium coating;

FIG. 3 is a side elevational view illustrating the embodiment wherein two metal bodies are to be bonded together; and FIG. 3a is a side elevational view of the coated metal bodies of FIG. 3 bonded together by means of an intermediate layer of lithium metal.

As is seen from the drawings, the method is simple. The surface of base metal body 1 is rubbed with solid lithium metal 2 as by rubbing lithium body 2 across the surface of base metal body 1. This can be done by hand or mechanically, the lithium body 2 being held as by suitable clamp means 4. Metal body 1 is heated to a temperature above the melting point of lithium, at least 375° F., so that in the traversal of lithium body 2 across base metal body 1 lithium melts where it contacts the surface of that body, wetting it with molten lithium and leaving behind a coating of molten lithium 3. By successive passes across the surface of base metal body 1, each pass being displaced somewhat in a given direction other than the principal direction of travel of lithium metal body 2 during rubbing, an entire selected area can be wet and coated with lithium as shown in FIG. 1a.

A uniform progressive action may be used, as with mechanical means; however, the same result may be accomplished in a relatively haphazard or cross-cross fashion much like filling in a selected area on a chalk board with chalk. The important factor is to rub essentially the entire area, which is to be coated, with the lithium.

During the rubbing action, pressure beyond that to provide simple rubbing contact between lithium body 2 and base metal body 1 is not essential. Nevertheless, the rubbing action results in wetting the surface of base metal body 1 and a uniform bond between the lithium and the base metal body where this action has occurred. It is presently theorized that the rubbing action, in conjunction with the heat involved and the melting lithium, provides intimate contact in all areas of the base metal traversed by the lithium and causes a reaction between the molten lithium and a surface oxide film on the metal body.

Once the lithium has been applied as an initial coating as described, the assembly—that is the base metal body with the molten lithium coating thereon—may be cooled to below the melting point of lithium to solidify the lithium layer. Simple wetting of the surface of the substrate metal body may provide a layer or film of lithium of from about 0.003″ to about 0.01″ thick. However, now that the surface of the substrate metal body has been uniformly wetted by the molten lithium, additional molten lithium may be added to the molten lithium film to increase the thickness of the lithium coating. This may be accomplished, as shown in FIG. 2, by holding with or without a rubbing action, solid lithium metal body 12 against the hot, lithium-coated surface of the base metal body 11 until the desired additional amount of lithium has melted and flowed to and become part of the lithium layer 13. On the other hand, molten lithium may be poured onto the initial film of molten lithium to build up the layer to the desired thickness. In these ways a final lithium coating having a thickness up to about 0.5″ thick may be formed on a horizontal planar surface and up to any desired thickness when a dam is provided to prevent run-off. Thin films of molten lithium will adhere to the surface of the base metal even in a vertical attitude. Preferably, however, the surface of the base metal body is in a substantially horizontal attitude when the lithium is applied. Once the desired amount of lithium has been applied to the base metal body, the assembly may simply be cooled to below the melting point of the lithium to solidify it.

Excess lithium metal in layer 13 may be removed or redistributed to provide the desired final, uniform lithium thickness and a smooth surface on lithium layer 13, by means of mechanical pressure, as by rolling, pressing, forging or the like, after the lithium has solidified. In this connection, petrolatum may be applied to the surface of the lithium to protect the lithium during mechanical working. The relative softness of the lithium permits it to be deformed by such mechanical acion without deforming the base metal body.

Two base metal bodies, other than lithium, may be bonded together in accordance with the embodiment illustrated in FIGS. 3 and 3a. Thus, two base metal bodies 21 and 21a, respectively, each having thereon a lithium coating 23 and 23a, respectively, may be brought together with the lithium coatings therebetween. The lithium coatings, in a molten condition, merge as one molten lithium layer 24 which, upon cooling to below the melting point of lithium and solidification, bonds the two base metal bodies 21 and 21a together. Base metal bodies 21 and 21a may be the same or dissimilar metals.

As stated, during the present method, the base metal should be at a temperature of at least about 375° F. The upper temperature limit employed may be dictated by factors determined by the nature of the base metal body. Thus the working temperature will be below the melting point of the base metal and, at the working temperature, the base metal body will have an oxide film of that base metal on its surface and should be incapable of forming, substantially immediately, a eutectic with lithium. While any temperature below the boiling point of lithium could be used, particularly in an inert atmosphere at temperatures above about 1000° F., there appears to be no advantage to be gained by exceeding about 900° F. A preferred working temperature is from about 500° F. to about 700° F. The method may be carried out in air, or in an inert atmosphere especially at the higher temperature.

The base metal to which the lithium is applied in accordance with the present method—and hence the base metals which may be wetted and coated with lithium—and, if desired, bonded together by means of the applied lithium—may vary widely so long as they have the characteristics referred to in the preceding paragraph. Metals suitable as base metal bodies are: beryllium, magnesium, scandium, titanium, vanadium, chromium, manganese, iron, cobalt, nickel, copper, zinc, yttrium, zirconium, niobium, molybdenum, cadmium, tin, antimony, hafnium, tantalum, tungsten, rhenium, thallium, lead, bismuth and thorium, including alloys predominating in one or more of the foregoing metals such as brass, alloys of nickel, chromium and iron (e.g. Inconel 600: 76% nickel, 16% chromium and 8% iron), alloys of nickel and copper (e.g. Monel metal: 65% nickel and 35% copper), alloys of chromium, nickel and iron (e.g. 316 SS stainless steel: 17% chromium, 12% nickel, 2–3% molybdenum and balance iron, and 304 SS stainless steel: 19% chromium, 10% nickel and balance iron), and the like. The present method is particularly applicable for making bimetallic structures, in which lithium is one of the metals, for use as electrodes in electric current-producing cells. For this purpose the preferred base metal bodies are copper, iron (especially low carbon steels—having from about 0.1 to about 0.25% carbon), nickel, titanium and tantalum.

The following examples are given for the purpose of illustration only and are not to be considered as limiting the scope of the invention in any way.

EXAMPLES 1–19

Sheets or plates of the following metals are heated to 600° F.

| Metal: | Thickness of sheet or plate (inches) |
|---|---|
| (1) Copper | 0.015 |
| (2) Titanium | 0.015 |
| (3) Iron (low carbon steel) | 0.015 |
| (4) Nickel | 0.015 |
| (5) Tantalum | 0.005 |
| (6) Zirconium | 0.010 |
| (7) Brass | 0.005 |
| (8) Magnesium | 1/8 |
| (9) Chromium | 1/16 |
| (10) Molybdenum | 1/8 |
| (11) Zinc | 1/8 |
| (12) Manganese | 1/16 |
| (13) Cobalt [1] | 1/8 |
| (14) Cadmium | 3/32 |
| (15) Tungsten [1] | 1/8 |
| (16) Inconel 600 (76% Ni, 16% Cr, 8% Fe) [1] | 1/8 |
| (17) Monel (65% Ni and 35% Cu) [1] | 1/8 |
| (18) 316 SS (17% Cr, 12% Ni, 2–3% Mo, bal. Fe) | 1/8 |
| (19) 304 SS (19% Cr, 10% Ni, bal. Fe) | 1/8 |

[1] Previously heated to red heat in air and cooled to room temperature.

A lithium rod ½″ in diameter is rubbed across the surface of the hot base metal body, wetting the surface with molten lithium and building up a lithium coating 0.040″ thick. The assemblies are then cooled to room temperature and mechanically worked, as by rolling or forging, to a lithium thickness of 0.015″, the excess lithium thus forced beyond the edges of the base metal sheet or plate being cut away. During mechanical working, no delamination of lithium is noted and a smooth, uniformly bonded layer of lithium is provided on the surface of each base metal which had been traversed by the lithium rod. Attempts to separate the lithium coating from the base metal by scraping and prying with a sharp blade are unsuccessful and show uniform bonding of the lithium to the base metal over the entire area covered by the lithium.

EXAMPLE 20

Two sheets of copper coated with lithium as above, are brought together with the lithium coatings between and heated to 375° F. to melt the lithium. After cooling to room temperature, lap shear tests show that it requires 450 lbs. to separate a bonded area of ⅝″ x 3″, the failure occurring in the lithium layer. This is equivalent to a shear strength of about 220 p.s.i., well above that of lithium.

Modification is possible in the selection of the base metal body as well as in the techniques employed without departing from the scope of the invention.

What is claimed is:

1. The method of bonding lithium to a body of metal other than lithium which comprises rubbing, with solid lithium metal, the surface of a solid body of metal other than lithium having a temperature of at least about 375° F., a melting point above said temperature, and, at said temperature, a stable film thereon of oxide thereof and being incapable, at said temperature, of forming, substantially immediately, a eutectic with lithium, whereby areas contacted with and traversed by said lithium are coated with molten lithium, and thereafter cooling said body of metal and lithium coating to below the melting point of lithium to solidify said lithium.

2. The method of claim 1 wherein said base metal body is at a temperature not over about 900° F.

3. The method of claim 2 wherein said base metal body is at a temperature of from about 500 to about 700° F.

4. The method of claim 1 wherein said base metal body is selected from the group consisting of copper, iron, nickel, titanium and tantalum.

5. The method of claim 1 wherein molten lithium is applied to said base metal body to a thickness of at least about 0.003″.

6. The method of claim 5 wherein additional molten lithium is applied to the initial coating of molten lithium.

7. The method of claim 1 wherein said body of metal coated with solidified lithium metal is subjected to mechanical pressure to provide said lithium coating with a uniform thickness.

8. The method of claim 7 wherein said body of metal coated with solidified lithium is subjected to a rolling operation.

References Cited

UNITED STATES PATENTS

| 2,327,739 | 8/1943 | Peters. | |
|---|---|---|---|
| 2,915,687 | 12/1959 | Allison | 117—200(S) |
| 3,211,572 | 10/1965 | Globus | 117—50 |

ALFRED L. LEAVITT, Primary Examiner

J. A. BELL, Assistant Examiner

U.S. Cl. X.R.

117—71, 118, 120, 130, 225; 118—76, 77